US008019956B1

(12) United States Patent
Ma et al.

(10) Patent No.: US 8,019,956 B1
(45) Date of Patent: Sep. 13, 2011

(54) SYSTEM AND METHOD FOR CONCURRENTLY STORING AND ACCESSING DATA IN A TREE-LIKE DATA STRUCTURE

(75) Inventors: Xiaoqin Ma, Mountain View, CA (US); Paul Yuedong Mu, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 855 days.

(21) Appl. No.: 12/044,788

(22) Filed: Mar. 7, 2008

(51) Int. Cl.
G06F 12/00 (2006.01)
(52) U.S. Cl. ...................................................... 711/163
(58) Field of Classification Search .................. None
See application file for complete search history.

(56) References Cited

U.S. PATENT DOCUMENTS

| | | | |
|---|---|---|---|
| 7,039,828 B1 | 5/2006 | Scott ................................. | 714/4 |
| 7,051,050 B2 | 5/2006 | Chen et al. ....................... | 707/1 |
| 7,302,520 B2 | 11/2007 | Kazar et al. ..................... | 711/114 |
| 7,409,497 B1 | 8/2008 | Kazar et al. ..................... | 711/114 |
| 2005/0192932 A1 | 9/2005 | Kazar et al. ..................... | 707/200 |

OTHER PUBLICATIONS

"User space," *Wikipedia, the free encyclopedia*, 1 page, http://en.wikipedia.org/wiki/Userspace, last modified Nov. 10, 2007, last visited Feb. 1, 2008.

*Primary Examiner* — Brian R Peugh
(74) *Attorney, Agent, or Firm* — Brinks Hofer Gilson & Lione

(57) ABSTRACT

A system and method are described for concurrently storing and accessing data in a tree-like data structure. In one embodiment, a data structure is identified comprising a plurality of nodes, at least one node of the plurality of nodes being associated with at least one other node of the plurality of nodes. Each node of the plurality of nodes is associated with an indicator indicative of an occurrence of a write operation related to the associated node. A determination is made if a write operation, related to any of the plurality of nodes, is occurring, and the associated indicator is set in accordance therewith. Access is prevented to any of the plurality of nodes whose associated indicator indicates the occurrence of the write operation, and access is allowed to others of the plurality of nodes.

20 Claims, 9 Drawing Sheets

SYSTEM AND METHOD FOR CONCURRENTLY STORING AND ACCESSING DATA IN A TREE-LIKE DATA STRUCTURE

BACKGROUND

An inode is a data structure used to store information, such as metadata, about a file. Data blocks are structures used to store the actual data for the file. Inodes and data blocks are typically stored in disk storage as tree-like data structures. A storage operating system controls access to the inodes and data blocks by managing the multiple concurrent read and write operations on the inodes and data blocks. The storage operating system implements a locking mechanism to support the write operations. The locking mechanism ensures the data integrity of the inodes and data blocks by locking access to an inode or data block while the inode or data block is undergoing a write operation. The locking mechanism unlocks access to the inode or data block when the write operation is complete.

The cost of locking data structures such as inodes and data blocks is high due to swapping between the user space and kernel space, and due to the cost associated with kernel locking. The user space is the space in virtual memory where all user mode applications work, while the kernel space is the space in virtual memory strictly reserved for running the kernel, kernel extensions and some device drivers. Most locking algorithms do not provide parallelism between write operations and read operations of a data structure, even though the operations may access different parts of the data structure. Instead, the locking algorithms lock the entire data structure whenever a write is performed on any part of the data structure, thereby preventing any concurrent read operations from occurring on the parts of the data structure unaffected by the write operation.

DETAILED DESCRIPTION

Figure 1:
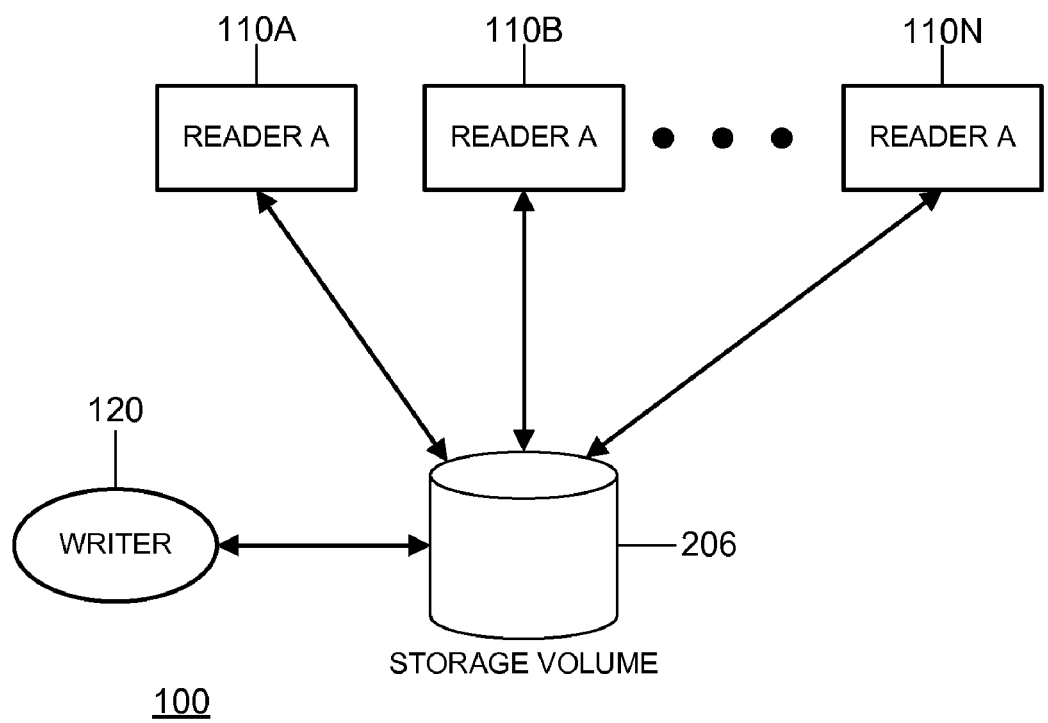
FIG. 1 is a block diagram of a general overview of a system of an embodiment for concurrently storing and accessing data.

In these embodiments, a system is presented for concurrently storing and accessing data in a data structure, which provides an advantage over the prior systems by locking only the parts of the data structure being written to during a write operation, as opposed to locking the entire data structure. This allows concurrent read operations to occur on the parts of the data structure unaffected by the write operation. Concurrently storing and accessing data in a data structure may refer to simultaneously performing a read operation on the data structure while a write operation is occurring on the data structure. Allowing concurrent read and write operations can greatly reduce the cost associated with using locking algorithms. For example, the efficiency of file system access may be vastly improved if the files in the file system are associated with data structures that can concurrently undergo read and write operations.

The system in these embodiments enables concurrent read and write operations on any data structure that includes multiple nodes associated with one another, such as a tree-like data structure. A node of a data structure is a logical placeholder for data and may include a reference to other nodes in the data structure. Each node in the data structure is associated with an indicator that is indicative of whether a write operation is currently occurring at the node. When a write operation related to one of the nodes occurs, the indicator associated with the node is set to reflect the occurrence of the write operation. Concurrent read and write operations are provided by preventing access to nodes whose indicator indicates the occurrence of a write operation while allowing access to the other nodes.

The nodes can be associated with one another through the use of pointers. For example, the child nodes of a parent node can be identified through pointers associated with the parent node. A more detailed discussion of the trees and the nodes in a tree will follow. The pointers can be used to prevent access to nodes associated with a node undergoing a write operation, such as preventing access to a child node while a parent node is undergoing a write operation.

The indicators associated with each node can be timestamps indicating the start time and end time of the most current write on the node. If the start time associated with a node is greater than the end time, then the node is currently being written to, i.e., the start time reflects the start time of a current write operation on the node, while the end time reflects the end time of the previous write operation on the node.

The system can be configured to ensure data integrity by invalidating a read operation if a write operation occurred while the read operation was occurring. For example, a node whose associated indicator shows that a write operation is not occurring might undergo a read operation. The system verifies that a write operation did not occur while the read operation was occurring. If a write operation occurred while the read operation was occurring the data is re-read from the node.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

Turning now to the drawings, FIG. 1 provides a general overview of a system 100 of an embodiment for concurrently storing and accessing data. Not all of the depicted components may be required, however, and some implementations may include additional components. Variations in the arrangement and type of the components may be made without departing from the spirit or scope of the claims as set forth herein. Additional, different or fewer components may be provided.

In this embodiment, the system 100 includes a storage volume 206, one or more readers 110A-N, and a writer 120. The storage volume 206 includes one or more tree-like structures, such as the structure described in FIG. 5 below. The tree-like data structure includes several nodes. Each node contains a value, such as data or a memory address referencing data, or a condition, such as an expression, or represents a separate data structure or a tree of its own. The readers 110A-N perform read operations on the data structures in the storage volume 206, while the writer 120 performs write operations on the data structures in the storage volume 206. In one embodiment a reader A 110A and a writer 120 can be a client system that stores data at storage volume 206 and requests services of the storage volume 206. The requested services may include performing a write operation so that data is written to the volume 206 and performing read operations to read data from the volume 206.

In order to maintain data integrity, the system 100 may utilize a locking algorithm. The locking algorithm locks one or more nodes when they are being written to, so as to prevent a read operation from occurring before a write operation completes. If a read operation does not attempt to access any nodes under a write operation, then the read algorithm can be executed in parallel with the write operation. The locking algorithm does not lock nodes unaffected by the write operation, thereby allowing the unaffected nodes to be accessed by the readers 110A-N during the write operation. The system 100 provides an advantage over the prior art by avoiding the high cost associated with locking the entire data structure during a write operation. The system 100 also provides better parallelism than the prior art by allowing the readers 110A-N to access unaffected nodes of the data structure during a write operation.

For example, a block change logger detects which blocks of a file have been modified and stores a data record describing the modified blocks. The data record includes a file system identifier, a file identifier and an offset value. The offset value identifies where in the file a write operation executed. The same offset value for the same file identifier won't be recorded more than one time. In the system 100 a file system component would intercept the block change logger after a write occurs. The file system component would store the data record describing the new write into a tree-like structure in the storage volume. A user level reader A 110A, such as an anti-virus application, could still scan the logger without stopping a write operation to the logger.

Figure 2:
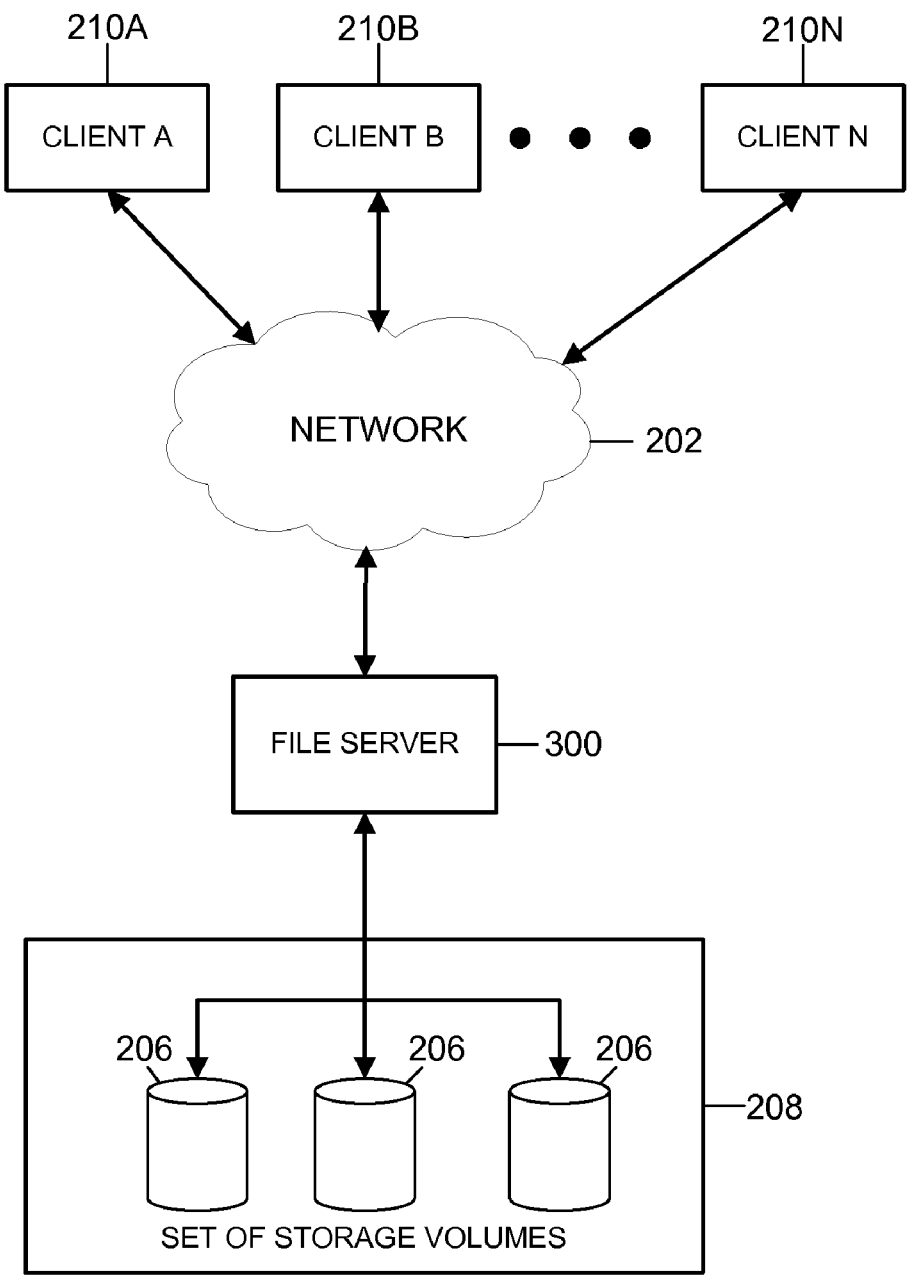
FIG. 2 is a block diagram of an exemplary network environment of an embodiment.

FIG. 2 is a block diagram of an exemplary network environment 200 of an embodiment. Network 202 can be a local area network (LAN), a wide area network (WAN), virtual private network (VPN) utilizing communication links over the internet, for example, or a combination of LAN, WAN, and VPN implementations. For the purposes of this description, the term network should be taken broadly to include any acceptable network architecture. The network 202 interconnects various clients 210A-N, such as the readers 110A-N and/or the writer 120. Also attached to the network 202 is a file server 300. The file server 300, which is described in more detail in FIG. 3 below, is configured to control storage of, and access to, data and a set 208 of interconnected storage volumes 206. The file server 300 may implement the locking algorithm to control access to the store volumes 206. Each of the devices attached to the network 202 includes an appropriate conventional network interface arrangement (not shown) for communicating over the network using desired communication protocols such as the well-known Transport Control Protocol/Internet Protocol (TCP/IP), User Datagram Protocol (UDP), Hyper Text Transport Protocol (HTTP), Simple Network Management Protocol (SNMP), or Virtual Interface Connections (VI).

Figure 3:
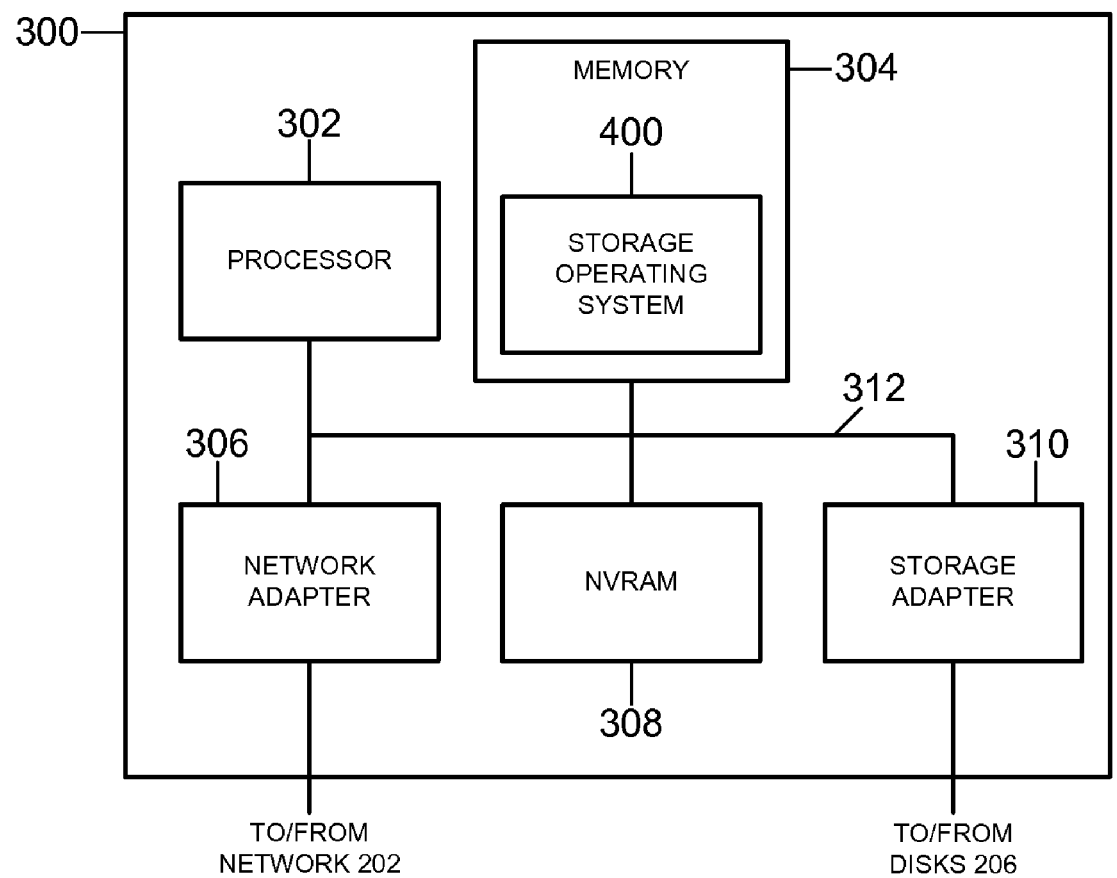
FIG. 3 is a block diagram of an exemplary file server of an embodiment.

FIG. 3 is a block diagram of an exemplary file server 300 in the network environment 200 of FIG. 2. The file server 300, or filer, is a computer that provides file service relating to the organization of information on storage devices, such as disks. The embodiments described herein can apply to any type of file server 300, whether implemented as a special-purpose or general-purpose computer, including a standalone computer. The file server 300 comprises a processor 302, a memory 304, a network adapter 306, a nonvolatile random access memory (NVRAM) 308, and a storage adapter 310 interconnected by system bus 312. Contained within the memory 304 is a storage operating system 400 that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored. The memory 304 includes storage locations that are addressable by the processor 302 and adapters for storing software program code. Portions of the operating system 400 are typically resident in memory and executed by the processing elements. The operating system 400 functionally organizes the file server 300 by inter alia, invoking storage operations in support of a file service implemented by the file server 300.

The network adapter 306 comprises the mechanical, electrical and signaling circuitry needed to connect the file server 300 to a client A 210A over network 202. Client A 210A maybe a general-purpose computer configured to execute applications, such as data base applications. Moreover, client A 210A may interact with the file server 300 in accordance with the client/server model of information delivery. That is, client A 210A may request the services of the file server 300, and the file server 300 may return the results of the services requested by client A 210A, by exchanging packets defined by an appropriate networking protocol.

The storage adapter 310 incorporates with the storage operating system 400 executing on the file server 300 to access information requested by client A 210A. Information may be stored on the disks 206 of the set of storage volumes 208 (FIG. 2) that is attached via the storage adapter 310 to the file server 300. The storage adapter 310 includes input/output (I/O) interface circuitry that couples to the disks 206 over an I/O interconnect arrangement, such as a conventional high-performance Fibre Channel serial link topology. The information is retrieved by the storage adapter 310 and, if necessary, processed by the processor 302 (or the adapter 310 itself) prior to be forwarded over the system bus 312 to the network adapter 306, where information is formatted into appropriate packets and returned to client A 210A.

In one exemplary file server implementation, the file server 300 can include a non-volatile random access memory (NVRAM) 308 that provides fault-tolerant backup of data, enabling the integrity of file server transactions to survive a service interruption based upon a power failure or other fault.

One type of file system is a "write in-place" file system, an example of which is the conventional Berkeley fast file system. In a write in-place file system, the locations of the data structures, such as inodes and data blocks, on disk are typically fixed. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated, and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a file server 300 is the Write Anywhere File Layout (WAFL™) file system available from Network Appliance, Inc. of Sunnyvale, Calif. The WAFL file system is implemented within a microkernel as part of the overall protocol stack of the file server 300 and associated disk storage. This microkernel is supplied as part of Network Appliance's Data ONTAP™ storage operating system, residing on the file server 300, that processes file-service requests from network-attached clients.

Figure 4:
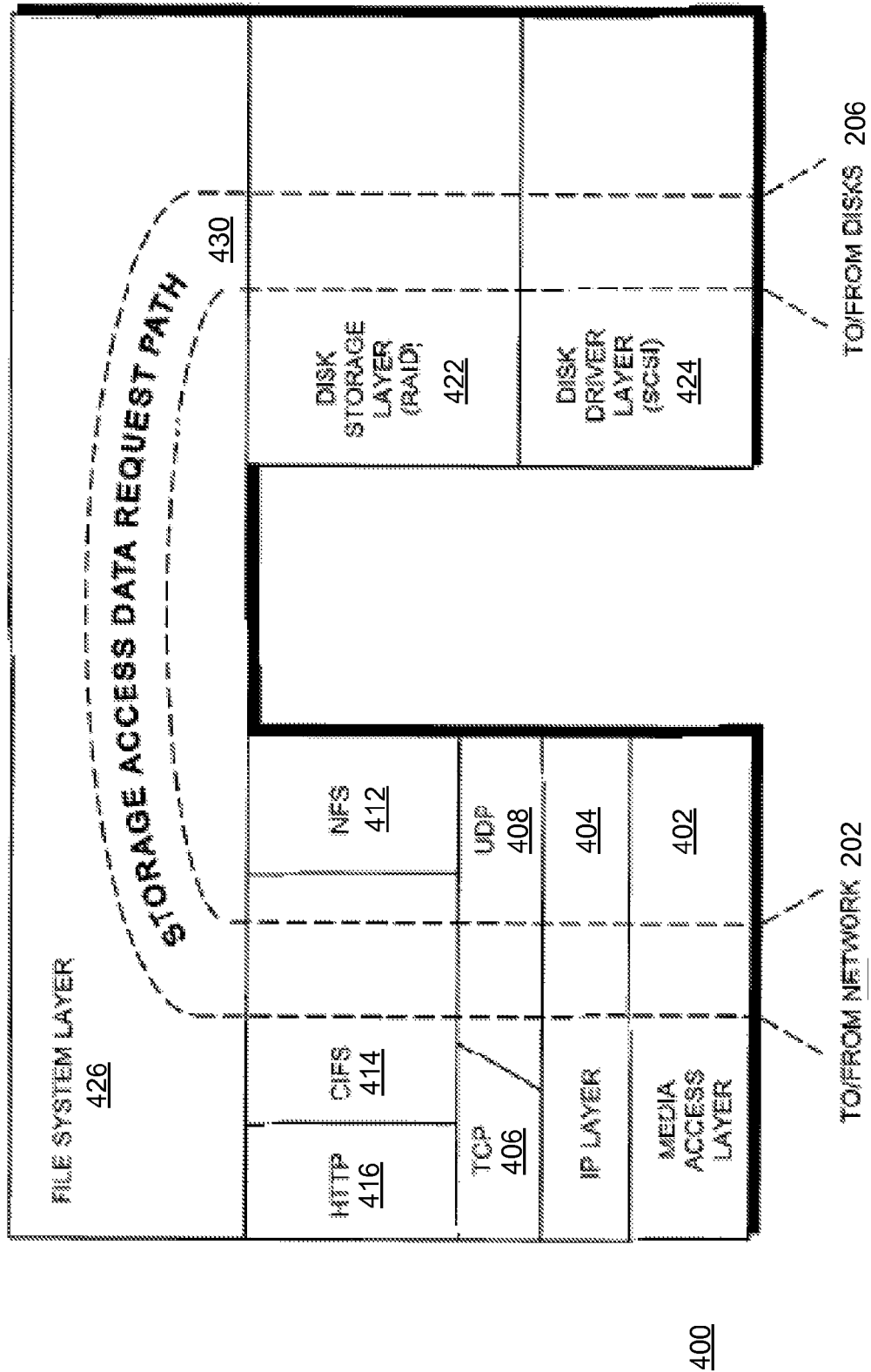
FIG. 4 is a block diagram of an exemplary storage operating system implemented by the file server of FIG. 3.

FIG. 4 is a block diagram of an exemplary storage operating system 400 implemented by the file server 300 of FIG. 3. Not all of the depicted components may be required, however, and some implementations may include additional components. Variations in the arrangement and type of the components may be made without departing from the spirit or scope of the claims as set forth herein. Additional, different, or fewer components may be provided.

The storage operating system 400 includes a series of software layers, such as a media access layer 402 of network drivers (e.g., an Ethernet driver). The storage operating system 400 further includes network protocol layers, such as an Internet Protocol (IP) layer 404 and its supporting transport mechanisms, the Transport Control Protocol (TCP) layer 406 and the User Datagram Protocol (UDP) layer 408.

A file system protocol layer 426 provides multi-protocol data access and includes support for the Network File System (NFS) protocol 412, the Common Internet File System (CIFS) protocol 414 and the Hyper Text Transfer Protocol (HTTP) 416. In addition, the storage operating system 400 includes a disk storage layer 422 that implements a disk storage protocol, such as a RAID protocol, and a disk driver layer 424 that implements a disk access protocol such as a Small Computer System Interface (SCSI) protocol.

A file system layer 426 bridges the disk software layers with the network and file system protocol layers. Generally, the file system layer 426 implements a file system having an on-disk format representation that is block-based using, e.g., 4-kilobyte (KB) data blocks and using inodes to describe the files. In response to transaction requests, the file system 426 generates operations to load (retrieve) the requested data from volumes 206 if it is not resident "in-core", i.e., in the filer's memory 304. If the information is not in memory 304, the file system layer 426 indexes into the inode file using the inode number to access an appropriate entry and retrieve a logical volume block number. The file system layer 426 then passes the logical volume block number to the disk storage (RAID) layer, which maps that logical number to a disk block number and sends the latter to an appropriate driver (for example, an encapsulation of SCSI implemented on a fibre channel disk interconnection) of the disk driver layer 422. The disk driver 422 accesses the disk block number from volumes 206 and loads the requested data in memory 304 for processing by the file server 300. Upon completion of the request, the file server 300 (and storage operating system 400) returns a reply, such as a conventional acknowledgement packet defined by the CIFS specification, to client A 210A over the network 202.

The storage access request data path 430 needed to perform data storage access for the client requests received by the file server 300 may alternately be implemented in hardware, software or a combination of hardware and software. For example, the storage access request data path 430 may be implemented as logic circuitry embodied within a field programmable gate array (FPGA) or in an application specific integrated circuit (ASIC). A hardware implementation increases the performance of the file service provided by the file server 300 in response to a file system request issued by client A 210A.

To facilitate the generalized access to the disks 206 on the array 208, the storage operating system 400 implements a write-anywhere file system that logically organizes the information as a hierarchical structure of directories and files on the disks. Each "on-disk" file may be implemented as a set of disk blocks configured to distort information, such as data, whereas the directory may be implemented as a specially formatted file in which other files and directories are stored. In the illustrative embodiment described herein, the operating system is the NetApp® Data ONTAP™ operating system available from Network Appliance, Inc., that implements the write-anywhere file layout (WAFL™) file system. It is expressly contemplated that any appropriate file system can be used, and as such, where the term WAFL or file system is employed, it should be understood that any file system that is otherwise adaptable to the teachings of these embodiments can be used. The storage operating system 400 can support both file-based access and block-based access.

Figure 5:
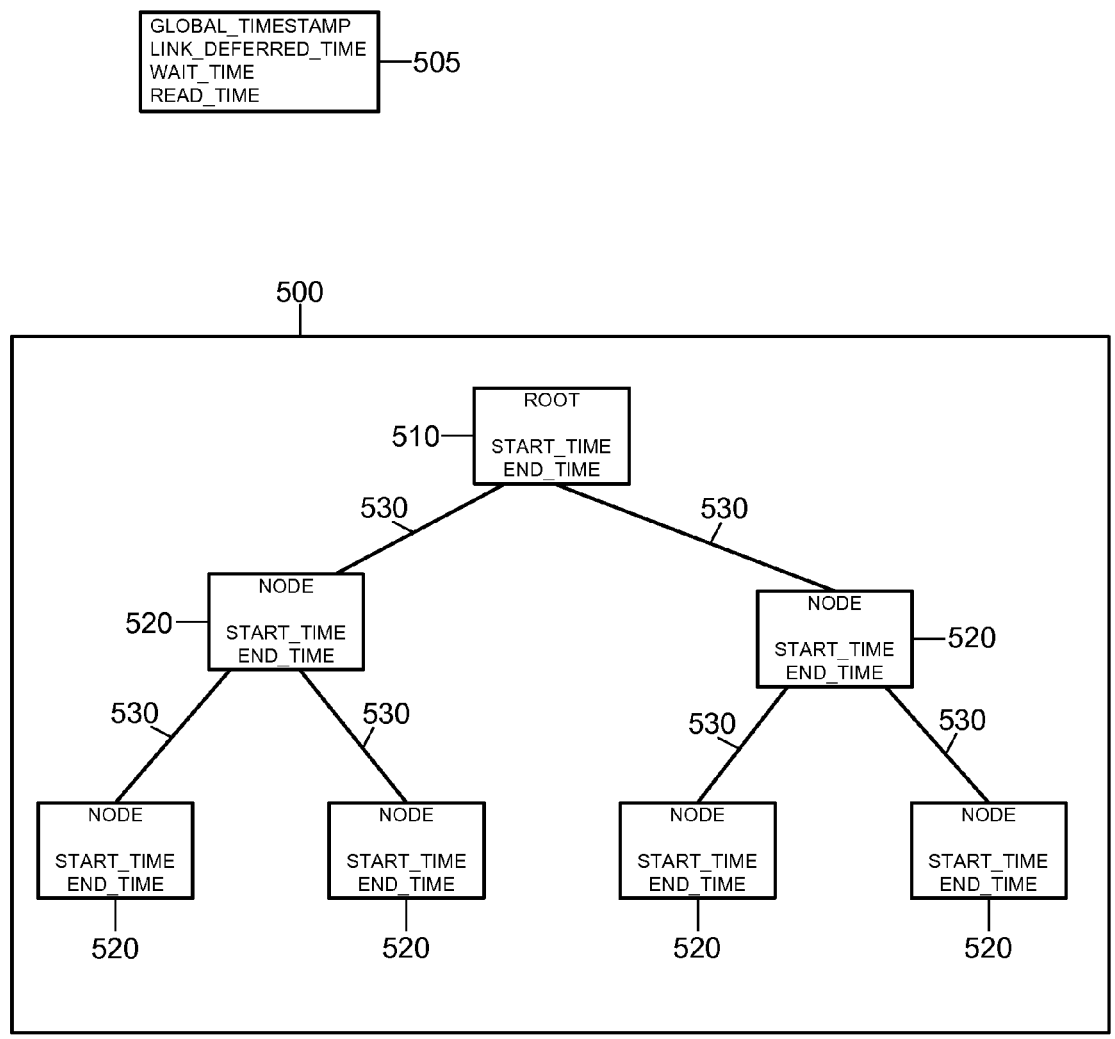
FIG. 5 is an illustration of a tree-like data structure used to store inodes and data blocks of an embodiment.

FIG. 5 illustrates a tree-like data structure 500 of an embodiment used to store inodes and data blocks in the system of FIG. 1. The tree-like data structure 500 may contain a root node 510 and one or more nodes 520. The root node 510 and each of the one or more nodes 520 may include one or more indicators, or variables, such as a start_time variable and an end_time variable. The system 100 may use the indicators in conjunction with one or more system-wide variables 505 stored in the memory 304, such as a global_timestamp variable, a link_deferred_time variable, a wait_time variable, and a read_time variable, to identify whether a node is being written to. The global_timestamp is maintained to indicate if there is a write operation currently executing in the data structure and when the write operation started. The global_timestamp acts as a logical identifier for a write operation; when the write operation completes the write operation clears the global timestamp. The link_deferred_time represents the start time of a read operation on a data structure. The wait_time variable is set to the start_time of a write operation and is compared against the global_timestamp to determine when the write operation completes. The read_time variable is set to the start_time of a node at the start of a read operation, and is compared against the start_time of the node once the read operation completes to verify a write operation did not occur while the read operation was occurring.

The system 100 determines if there is a write operation executing on a node 520 by comparing the start_time variable and end_time variable of the node 520. To verify that a pointer to a child node is valid, the time the link to the child node was most recently modified is compared with the link_deferred_time during the traversal of the tree. The time the link was most recently modified is equal to the end_time of the child node.

Some examples of tree-like data structures 500 may include a binary tree, a heap, a queue, a self balancing binary search tree, a B-tree, a dancing tree, a fusion tree, a Radix tree, a T-tree, a skip list, or generally any data structure which stores data in a tree-like structure.

A node 520 may contain a value or a condition, such as data or a memory address referencing data, or a condition, such as an expression, or represents a separate data structure or a tree 500 of its own. Each node 520 in a tree-like structure 500 has zero or more child nodes, which are below the node in the tree 500. A node 520 that has a child is called the child's parent node (or ancestor node, or superior). A node 520 typically has at most one parent. A parent node is associated with one or more pointers which point to its child nodes. The pointers indicate a logical association between the parent nodes and the child nodes. The height of a node 520 is the length of the longest downward path to a leaf from that node 520. The height of the root 510 is the height of the tree 500. The depth of a node 520 is the length of the path to its root 510 (i.e., its root path). Nodes 520 at the bottom most level of the tree 500 are called leaf nodes. Since they are at the bottommost level, they do not have any children. An internal node or inner node is any node of a tree 500 that has child nodes and a parent node and is thus not a leaf node.

The topmost node in a tree 500 is called the root node 510. Being the topmost node, the root node 510 does not have parents. The root node 510 is the node at which operations on the tree typically begin. Alternatively or in addition, some algorithms begin with the leaf nodes and work up, ending at the root node 510. All other nodes 520 can be reached from the root node 510 by following edges or links 530. Alternatively or in addition, each such path may be unique. In some trees 500, such as heaps, the root node 510 has unique properties, such as every node 520 in a tree 500 can be seen as the root node 510 of the subtree rooted at that node 520.

A specific node 520 of a tree 500 may be accessed by traversing through the tree 500. Traversing through the nodes 520 of a tree 500 is accomplished by way of the connections 530 between parents and children. Often, an operation, such as a read operation or a write operation, might be performed when a pointer arrives at a particular node 520. A traversal in which each parent node is traversed before its children is called a pre-order traversal. A traversal in which the children are traversed before their respective parents are traversed is called a post-order traversal.

Figure 6:
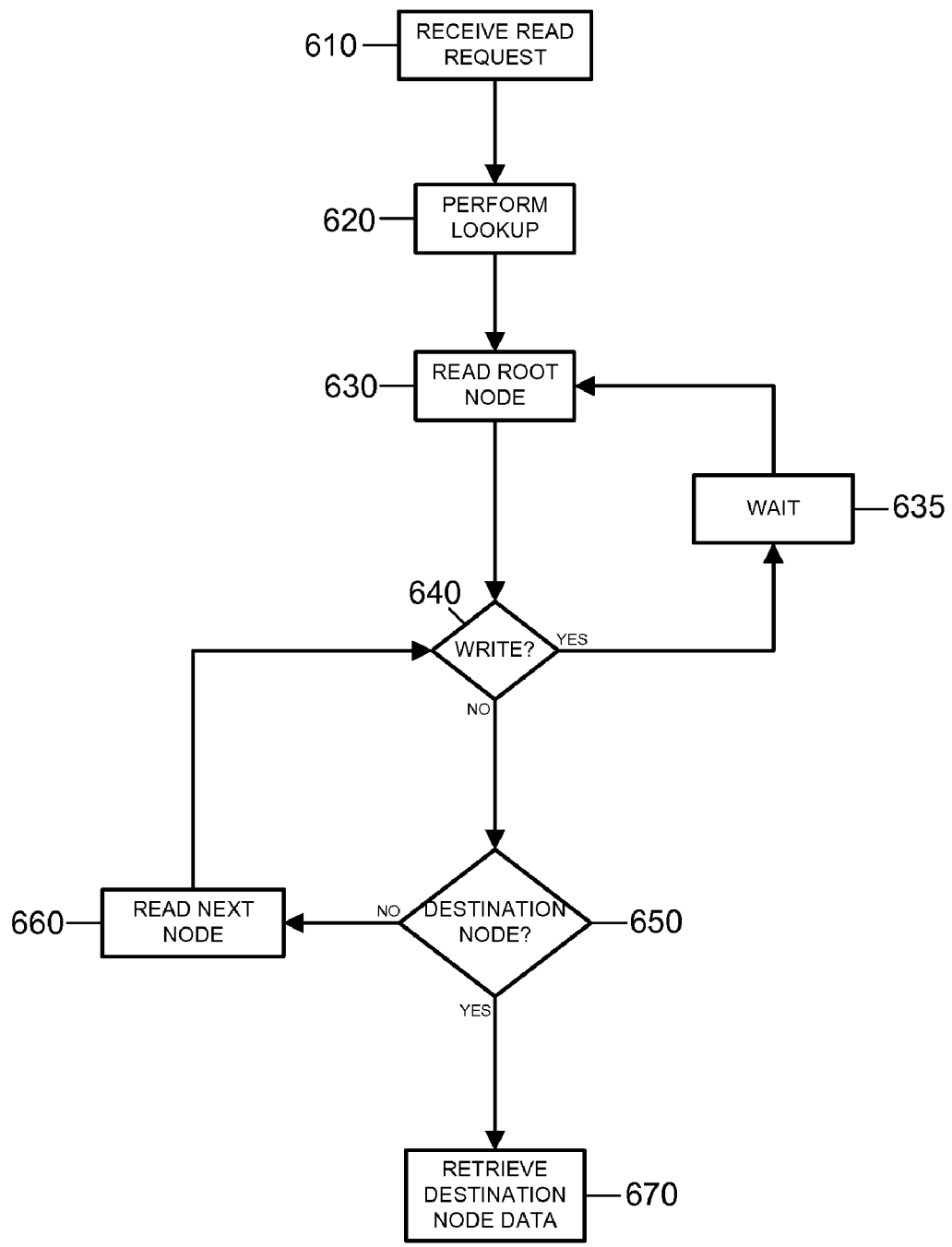
FIG. 6 is a flowchart illustrating a read operation of an embodiment.
Figure 7:
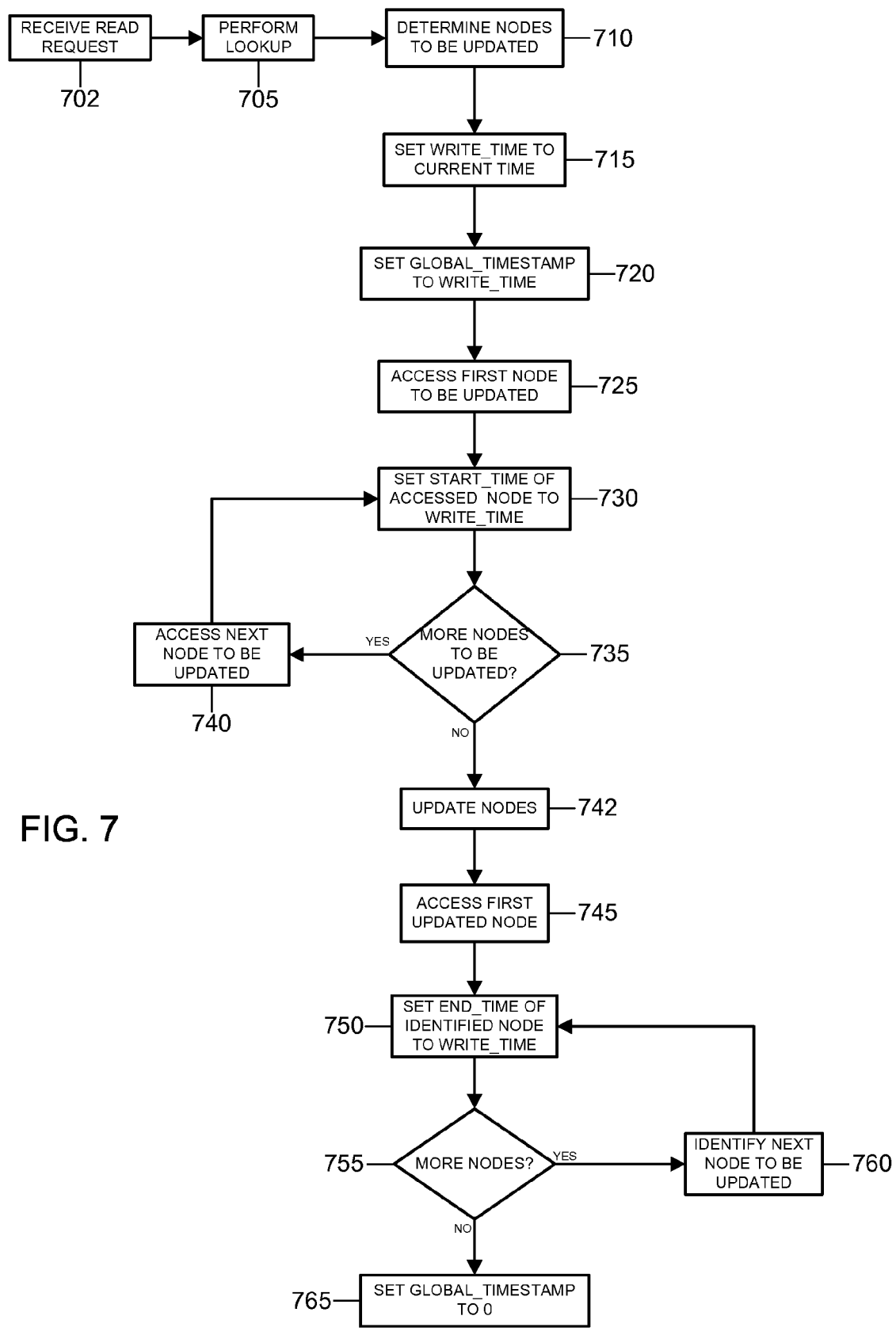
FIG. 7 is a flowchart illustrating a write operation of an embodiment.

FIG. 6 is a flowchart illustrating an overview of a read operation of an embodiment. At step 610, the system 100 receives a read request, such as a request from one of the clients 210A-N. At step 620, the system 100 performs a lookup to determine the node containing the requested data, or the destination node, and to gather the space information, such as data space information, of all of the nodes on the path to the destination node. At step 630, the system 100 reads the indicators of the root node 510. At step 640, the system 100 determines whether the currently accessed node is undergoing a write operation. The details related to determining whether a node is undergoing a write operation are illustrated in FIG. 7 below.

If, at step 640, the system 100 determines that the currently accessed node is undergoing a write operation, the system 100 moves to step 635. At step 635, the system 100 may wait for a set period of time, such as 100 milliseconds. The system 100 then returns to step 630 where the traversal of the data structure is reset and the indicators of the root node 510 are read again.

If, at step 640, the system 100 determines that a write is not occurring at the currently-accessed node, then the system 100 moves to step 650. At step 650, the system 100 determines whether the currently-accessed node is the destination node. If, at step 650, the system 100 determines that the currently accessed node is not the destination node, then the system 100 moves to step 660. At step 660, the system 100 reads the indicators of the next node in the traversal of the data structure, which becomes the currently-accessed node. At step 640, the system 100 repeats the aforementioned steps in regard to the currently-accessed node.

If, at step 650, the system 100 determines that the currently-accessed node is the destination node, then the system 100 moves to step 670. At step 670, the system 100 retrieves the data stored at the currently-accessed node and communicates the data to client A 210A.

FIG. 7 is a flowchart illustrating the steps of a write operation of an embodiment. At step 702, the system 100 receives a write operation request, such as a request from the writer 120. The requested write operation may include a write, update, or delete of data in the storage volumes 206. At step 705, the system 100 performs a lookup to determine one or more nodes containing the requested data to be updated, the destination nodes, and to gather the space information of all of the nodes on the path to the destination nodes. At step 710, the system 100 determines which nodes need to be updated to perform the write operation request of the writer 120. At step 715, the system 100 sets a write_time variable equal to the current time. At step 720, the system 100 sets a global_timestamp variable equal to the write_time variable. Setting the global_timestamp variable to a number other than 0 indicates a write operation is in the process of being executed.

At step 725, the system 100 accesses the first node in data structure to be updated. The first node of the data structure to be updated may be the first node encountered on a traversal of the data structure starting from the root node 510. At step 730, the system 100 sets the start_time indicator of the currently-accessed node equal to the write_time variable. In one embodiment the system 100 may traverse through the data structure and set the start_time equal to the write_time for any nodes to be updated. To this effect, at step 735, the system 100 determines if there are more nodes in the data structure that need to be updated. If there are more nodes in the data structure to be updated, the system 100 moves to step 740. At step 740, the system 100 accesses the next node to be updated and moves to step 730 to repeat the process.

Once the start_time indicator has been set for all of the nodes to be updated, the system 100 moves to step 742. At step 742, the system 100 updates all of the nodes requested by the write operation, such as by creating, modifying, or deleting the nodes. Once all of the nodes have been updated, the system 100 moves to step 745. At step 745, the system 100 accesses the first updated node in the data structure. At step 750, the system 100 sets the end_time variable of the currently-accessed node equal to the write_time variable. At step 755, the system 100 determines whether additional updated nodes remain. If additional updated nodes remain, the system 100 moves to step 760. At step 760, the system 100 accesses the next updated node, and the system 100 moves to step 750 to repeat the above process.

Once the end_time variable of all the updated nodes has been updated, the system 100 moves to step 765. At step 765, the system 100 sets the global_timestamp variable to 0, indicating that the write operation has completed.

Figure 8:
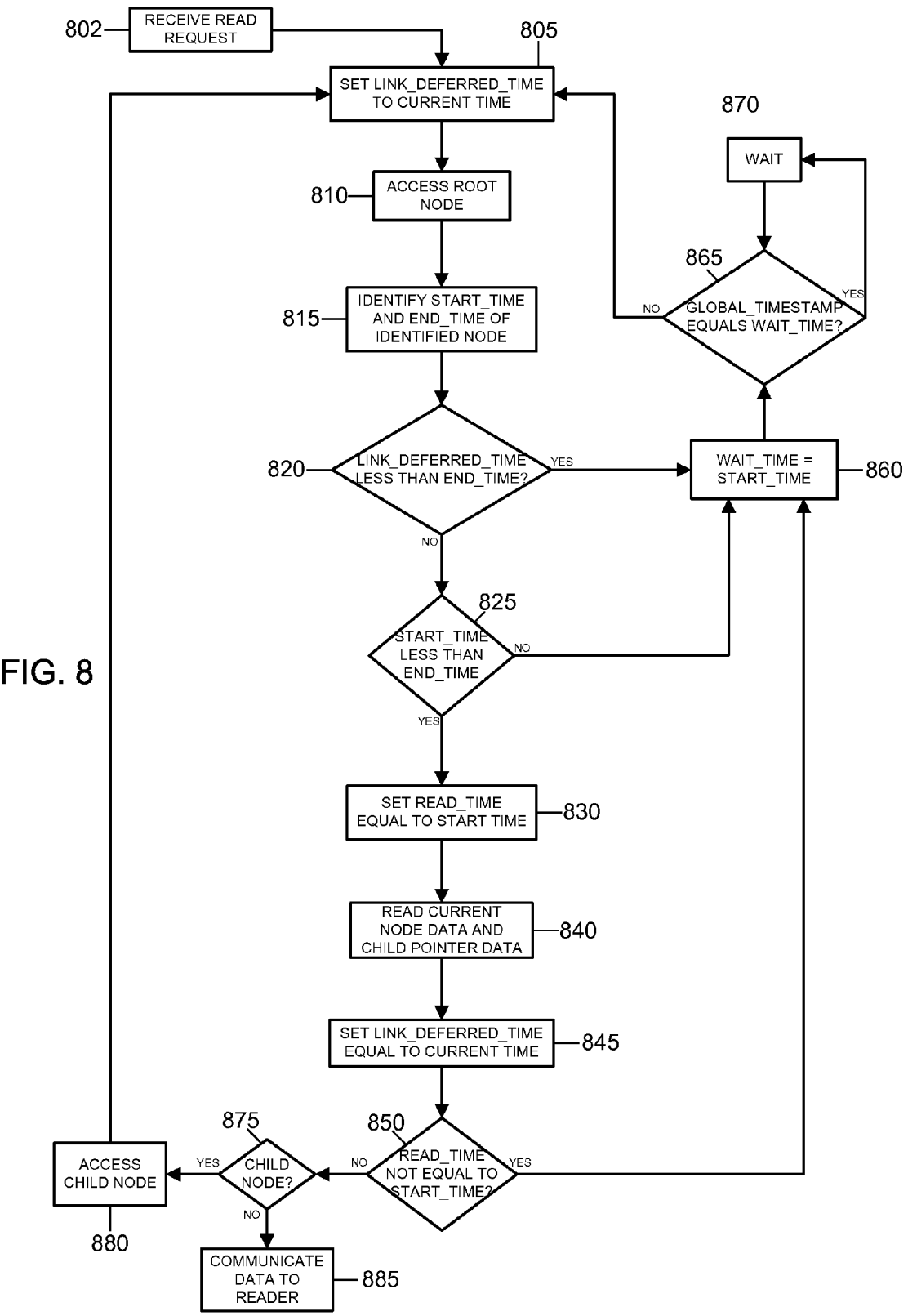
FIG. 8 is a flowchart illustrating a read operation of an embodiment.

FIG. 8 is a flowchart illustrating the steps of a read operation of an embodiment. At step 802, the system 100 receives a read operation request, such as a request from one of the readers 110A-N. At step 805, the system 100 sets the system-wide link_deferred_time variable equal to the current time. At step 810, the system 100 accesses the root node 510 of the data structure. At step 815, the system 100 may identify the start_time and the end_time of the currently-accessed node, in this instance the root node 510. At step 820, the system 100 determines whether the link_deferred_time variable is less than the end_time variable of the currently accessed node. The system 100 compares the link_deferred_time against the end_time of the currently-accessed node to ensure the link is up to date. If the link is out of date, a write may have occurred on both the parent and child after the child pointer had been read but before the read operation accessed the child node. Alternatively, the system 100 can detect a deleted node as a node's start_time is updated when it gets deleted. Once a node is deleted the child pointer is no longer be valid.

If the link_deferred_time is not less than the end_time of the currently-accessed node, the system 100 moves to step 825. At step 825, the system 100 determines whether the start_time of the currently-accessed node is less than the end_time of the currently accessed node. If the start_time variable is less than the end_time variable of the currently-accessed node, then the node is not undergoing a write operation, and the system 100 moves to step 830. At step 830, the system 100 sets the system-wide read_time variable equal to the start_time variable of the current accessed node. At step 840, the system 100 reads the data associated with the currently-accessed node, including the pointers to any child nodes of the currently-accessed node. At step 845, the system 100 sets the system-wide link_deferred_time variable equal to the current time. At step 850, the system 100 verifies that a write operation did not execute while the read operation was executing by determining whether the system-wide read_time variable is equal to the start_time variable of the currently-accessed node. If the read_time variable is equal to the start_time variable of the currently-accessed node, then no write operation executed while the read operation was executing, and the system 100 moves to step 875. At step 875, the system 100 determines whether a pointer to a child node exists. If a pointer to a child node exists, the system moves to step 880. At step 880, the system 100 accesses the child node and returns to step 805 to reset the system-wide link_deferred_time and repeat the process. If, at step 875, the system 100 determines that a pointer to the child node does not exist, then the read operation is complete, and the system 100 moves to step 885. At step 885, the system 100 communicates the requested data to reader A 210A.

There are several operations in the read process where the system 100 may determine that a write has occurred or is occurring. If, at step 820, the link_deferred_time is less than the end_time of the currently-accessed node, or, if at step 825, the start_time is not less than the end_time of the currently-accessed node, or, if at step 850, the read_time is not equal to the start_time, then the node is undergoing a write operation, and the system 100 moves to step 860. At step 860, the system 100 sets the system-wide wait_time variable equal to the start_time of the currently-accessed node. The system 100 then moves to step 865.

At step 865, the system 100 determines whether the system-wide global_timestamp variable equals the system-wide wait_time variable. If the global_timestamp variable equals the wait_time variable, then a write operation is currently executing, and the system 100 waits at step 870. Once the write operation is completed, the system will set the global_timestamp variable equal to 0. If, at step 865, the system 100 determines that the global_timestamp variable is not equal to the wait_time variable, then the write operation has completed, and the system 100 moves to step 805 to reset the system-wide link_deferred_time and repeat the process.

Figure 9:
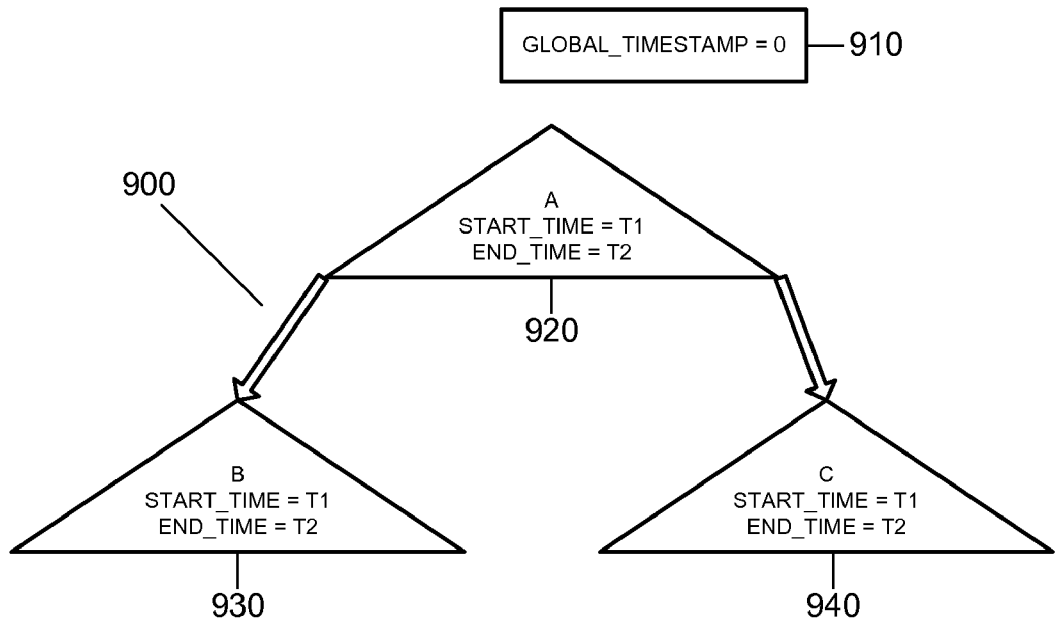
FIG. 9 is an illustration of an exemplary tree-like data structure not undergoing a write operation.

FIG. 9 illustrates an exemplary tree-like data structure 900 of an embodiment. The tree-like data structure 900 includes a root node A 920, a child node B 930, and a child node C 940. The root node A 920, the child node B 930, and the child node C 940 are each associated with a start_time and an end_time. The start_time of root node A 920, child node B 930, and child node C 940 is equal to T1, and the end_time of root node A 920, child node B 930, and child node C 940 is equal to T2. The time T1 is less than the time T2. The global_timestamp 910 for the tree-like data structure 900 is equal to 0, indicating the tree-like data structure 900 is not undergoing a write operation. Since the tree-like data structure 900 is not undergoing a write operation, root node A 920, child node B 930, and child node C 940 may be read by the one or more readers 110A-N.

Figure 10:
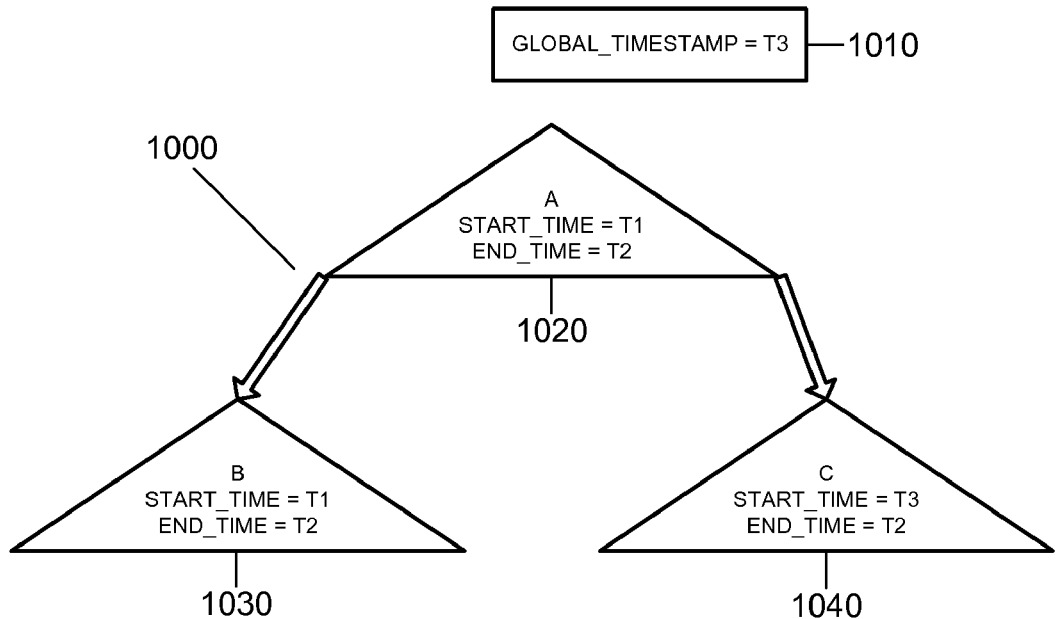
FIG. 10 is an illustration of an exemplary tree-like data structure undergoing a write operation.

FIG. 10 illustrates an exemplary tree-like data structure 1000 of an embodiment. The tree-like data structure 1000 includes a root node A 1020, a child node B 1030, and a child node C 1040. Root node A 1020, child node B 1030, and child node C 1040 are each associated with a start_time and an end_time. The start_time of root node A 1020 and child node B 1030 is equal to T1, and the start_time of child node C 1040 is equal to T3. The end_time of root node A 1020, child node B 1030 and child node C 1040 is equal to T2. The time T1 is less than the time T2, and the time T2 is less than the time T3. The global_timestamp 1010 for the tree-like data structure 1000 is equal to T3, indicating that a write operation on the tree-like data structure 1000 started at T3.

Since the start_time of child node C 1040 is greater than the end_time of child node C 1040, the child node C 1040 is undergoing the write operation. Child node C 1040 may not be read by one of the readers 110A-N until the write operation has completed. Root node A 1020 and child node B 1030 are not undergoing a write operation since their respective start_times are less than their respective end_times. Thus, root node A 1020 and child node B 1030 may be read by the readers 110A-N while child node C 1040 is undergoing the write operation.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method for concurrently storing and accessing data, the method comprising:
   identifying a data structure comprising a plurality of nodes, at least one node of the plurality of nodes being associated with at least one other node of the plurality of nodes;
   associating each node of the plurality of nodes with an indicator indicative of an occurrence of a write operation related to the associated node;
   determining if a write operation, related to any of the plurality of nodes, is occurring and setting the associated indicator in accordance therewith; and
   preventing access to any of the plurality of nodes whose associated indicator indicates the occurrence of the write operation and allowing access to others of the plurality of nodes.

2. The method of claim 1, wherein the at least one node is associated with the at least one other node via a pointer.

3. The method of claim 1 further comprising preventing access to the at least one other node when the indicator associated with the at least one node indicates the occurrence of the write operation.

4. The method of claim 1, wherein the indicator associated with each node comprises at least one timestamp, wherein the at least one timestamp comprises at least one of a start time and an end time of the last write operation related to the node.

5. The method of claim 1 further comprising:
reading a node whose associated indicator indicates the write operation is not occurring; and
verifying the write operation related to the node did not occur while the read operation was occurring.

6. The method of claim 1, wherein the nodes are associated with files in a file system.

7. A method for supporting concurrent read and write operations in a data structure, the method comprising:
(a) receiving a request from a reader for an item stored in a data structure, wherein the data structure comprises a plurality of nodes, at least one node of the plurality of nodes being associated with at least one other node of the plurality of nodes;
(b) determining the node where the item is stored;
(c) performing a read operation at the node to retrieve the item if a write operation related to the node is not occurring, otherwise waiting until the write operation has completed to perform the read operation;
(d) determining whether the write operation related to the node occurred while the read operation was occurring;
(e) repeating (b)-(c) until the read operation occurs without the write operation occurring concurrently; and
(f) communicating the item to the reader.

8. The method of claim 7, wherein the at least one node is associated with the at least one other node via a pointer.

9. The method of claim 7, wherein each node is associated with at least one timestamp indicating at least one of a start time and an end time of the last write operation related to the node.

10. The method of claim 7, wherein determining whether the write operation related to the node occurred while the read operation was occurring further comprises determining whether the write operation occurred while the read operation was occurring by analyzing the at least one timestamp associated with the node.

11. A system for concurrently storing and accessing data, the system comprising:
a memory operative to store a data structure comprising a plurality of nodes, at least one node of the plurality of nodes being associated with at least one other node of the plurality of nodes; and
a processor operatively connected to the memory and operative to:
associate each node of the plurality of nodes with an indicator indicative of an occurrence of a write operation related to the associated node;
determine if a write operation, related to any of the plurality of nodes, is occurring and set the associated indicator in accordance therewith; and
prevent access to any of the plurality of nodes whose associated indicator indicates the occurrence of the write operation and allowing access to others of the plurality of nodes.

12. The system of claim 11 wherein the at least one node is associated with the at least one other node via a pointer.

13. The system of claim 11 wherein the processor is further operative to prevent access to the at least one other node when the indicator associated with the at least one node indicates the write operation is occurring.

14. The system of claim 11 wherein the indicator associated with each node comprises at least one timestamp, wherein the least one timestamp comprises at least one of a start time and an end time of the last write operation related to the node.

15. The system of claim 11 wherein the processor is further operative to read a node whose associated indicator indicates the write operation is not occurring, and verify the write operation did not occur on the node while the read operation was occurring.

16. The system of claim 11, wherein the nodes are associated with files in a file system.

17. A system for concurrently storing and accessing data, the system comprising:
a memory operative to store a data structure comprising a plurality of nodes, at least one node of the plurality of nodes being associated with at least one other node of the plurality of nodes; and
a processor in communication with the memory and operative to:
(a) receive a request from a reader for an item stored in a data structure;
(b) determine the node where the item is stored;
(c) perform a read operation at the node to retrieve the item if a write operation related to the node is not occurring, otherwise wait until the write operation has completed to perform the read operation;
(d) determine whether the write operation related to the node occurred while the read operation was occurring;
(e) repeat (b)-(c) until the read operation occurs without the write operation occurring concurrently; and
(f) communicate the item to the reader.

18. The system of claim 17, wherein the at least one node is associated with the at least one other node via a pointer.

19. The system of claim 17, wherein each node is associated with at least one timestamp indicating at least one of a start time and an end time of the last write operation related to the node.

20. The system of claim 17, wherein determining whether the write operation related to the node occurred while the read operation was occurring further comprises determining whether the write operation occurred while the read operation was occurring by analyzing the at least one timestamp associated with the node.

* * * * *